3,830,754
CATALYST COMPOSITION
William John Ball, Capel, England, assignor to BP Chemicals International Limited, London, England
No Drawing. Filed Apr. 20, 1972, Ser. No. 245,934
Claims priority, application Great Britain, Apr. 22, 1971, 10,674/71
Int. Cl. B01j 11/06, 11/32
U.S. Cl. 252—456                9 Claims

ABSTRACT OF THE DISCLOSURE

Catalyst compositions containing antimony, vanadium and tin are prepared by addition of moist ammonium vanadate to a suspension of antimony trioxide in nitric acid followed by addition of powdered tin and recovery and heating of solid.

---

The present invention relates to a catalytic composition particularly for use in the production of unsaturated aliphatic aldehydes and acids.

British Patent Specification No. 1,034,914 (Distillers) describes and claims a process for the production of acrylic acid which comprises the oxidation of acrolein or a compound giving rise to acrolein under the reactions conditions e.g. propylene, with molecular oxygen at an elevated temperature and the vapour phase in the presence as catalyst of an oxide composition containing antimony and vanadium which has been heated before use to a temperature within the rage 550 to 1000° C. in a molecular oxygen-containing gas. One particular catalyst which may be employed is an oxide composition containing antimony, vanadium and tin.

The components of the catalyst may be mixed in any order, and the catalyst may be prepared in various ways. For instance, the antimony and vanadium together with the tin may be co-precipitated from a mixed aqueous solution of their soluble salts, for example the chlorides. In this case the precipitation may be carried out by the addition of ammonia. The precipitate is then thoroughly washed with water to remove soluble salts, for example, ammonium chloride.

Alternatively an antimony/vanadium oxide composition may be prepared and the tin subsequently incorporated. The antimony/vanadium oxide composition may be prepared by co-precipitation as before or by intimately mixing one or more oxides of antimony such as trioxide, tetroxide, pentoxide or a hydroated oxide with one or more oxides of vanadium. Mixtures of the oxides or hydrated oxides, for example, those formed by the action of aqueous nitric acid on antimony and vanadium metals or on mixtures of metals may also be used. In this case the mixed oxide composition contains residual nitrate ion and this may be removed by washing either with hot water or with a dilute solution of ammonia or an organic base. The tin may then be added to the mixture, for example, as an insoluble neutral compound which is convertible to oxide on heating. Examples of such insoluble neutral compounds are the hydroxide, carbonate and hydrated oxide. Alternatively the tin may be added to the antimony/vanadium composition in the form of a soluble salt or salts such as a nitrate, formate, acetate, chloride or sulphate, the oxides then being precipitated by the addition of a base such as ammonia. A preferred method of preparing the catalyst comprises mixing finely divided vanadium pentoxide with a slurry or suspension in water of the other oxides or hydrated oxides.

It has now been found possible to increase the activity and selectivity of an oxide composition containing antimony, vanadium and tin as catalyst for the oxidation of acrolein (or propylene) to produce acrylic acid by adopting a particular method of preparation.

Accordingly the present invention is a catalyst, suitable for catalysing the vapour phase oxidation of propylene, with molecular oxygen to produce acrolein together with acrylic acid, which comprises an oxide composition containing antimony, vanadium and tin prepared by adding most ammonium vanadate to a suspension of antimony trioxide in nitric acid, adding powdered tin to the resultant suspension, thereafter.

(a) adjusting the pH of the suspension to 7 or above and recovering suspended solid, or
(b) recovering solid from the suspension, resuspending in water, adjusting the pH of the suspension to 7 or above and recovering suspended solid, and finally heating the recovered solid in a molecular oxygen containing gas at a temperature in the range 550–1000° C.

The proportions of the various components of the oxide composition catalyst may vary within moderately wide limits. Suitably the composition contains an excess of antimony over any other single component and preferably an atomic ratio of antimony to vanadium within the range 1.5:1 to 4:1; or more especially between 2.0:1 and 3.0:1. It is preferred to have an atomic ratio of vanadium to tin within the range 1:0.25 to 1:2.

The pH of the suspensions of solid on resuspended solid is preferably adjusted to between 7 and 9 and especially in the range 7.2 to 8. The pH may be adjusted an any convenient manner for example by addition of ammonia or other water soluble nitrogenous base e.g. aliphatic amines, ethanolamine, ethylamine, triethylamine, ethylene diamine aromatic or heterocyclic amines such as aniline, pyridine, cycloaliphatic amines such as piperidine and compounds such as hydrazine.

The recovered solid is heated preferably first prior to pelleting in an inert atmosphere to a temperature in the range 200 to 500° C. The inert atmosphere may be any which does not react with the composition. Suitable examples of gases which may constitute an inert atmosphere are nitrogen or argon. The solid thus heated may thereafter be pelleted and the pellets subjected for a further heat treatment at a temperature within the range 550° to 1000° C. preferably 700 to 900° C. and more especially between 750 and 850° C., in a molecular oxygen containing gas e.g. air. The time of heating is not critical and may be, for example, from about 4 hours to about 40 hours. The rate of heating may be varied within wide limits. Thus for example the catalyst may be heated to 150° C. and then at an average rate of 50°/hour preferably between 10 and 25°/hour until the desired upper limit of temperature is reached. The supply of molecular oxygen containing gas e.g. air at this time is preferably adjusted to leave a concentration of oxygen in excess of 5% in the gases leaving the heating furnace. It has been found that the prior heat treatment of the oxide composition is essential in order for it to be of value as a catalyst in the commercial scale process.

The oxide composition catalysts may if desired, be deposited upon supports such as alumina, pumice, silica or titania.

The reaction of propylene with molecular oxygen over the oxide composition catalysts may be carried out in any suitable manner, for instance, as a fixed bed process in which the catalyst is used in the form of granules or pellets, or as a fluidised bed process, or as a moving bed process.

The proportion of propylene in the feed to the reaction may vary within fairly wide limits, for example between 1 and 20% by volume of the feed, and suitably between 2 and 10% by volume.

The concentration of oxygen in the feed may also vary within moderately wide limits, for example between 1 and 20% by volume and preferably between 2 and 15% by volume. The oxygen may be diluted with inert gases, and may be, for example, supplied as air.

It is preferred to carry out the reaction in the presence of a gas which is substantially inert under the conditions of reaction, for example, nitrogen, propane, butane, isobutane, carbon dioxide and/or steam. It is preferred to use steam or nitrogen or mixtures thereof. The concentration of the steam may vary within limits, for example, between 10 and 60% by volume of the feed.

The reaction is carried out at an elevated temperature, for instance between 250° C. and 550° C. and preferably between 300 and 500° C. The reaction may also be carried out under pressure for example pressures of from 0.5 to 5 atmospheres absolute.

The contact time may be, for example, in the range ½ to 30 seconds and preferably between 1 and 5 seconds.

The acrolein acrylic acid may be recovered from the reaction product by any conventional method, for example, by condensation or extraction with water and distillation.

The process of the invention is further illustrated by the following example:

EXAMPLE

A series of catalysts were prepared as described below.

Moist ammonium metavanadate paste (vanadium content 41.4% weight; 2755 parts by weight) was added over 25 minutes to a mechanical stirred suspension of antimony trioxide (4664 parts by weight) in concentrated 70% nitric acid (13,400 parts by weight) and distilled water (24,000 parts by weight) at 95° C., powdered tin (1898 parts by weight) was added over 40 minutes, stirring continued for a further 15 minutes, then the mixture cooled to 30° C. and filtered. The filter-cake was suspended in distilled water (24,000 parts by weight and the pH raised by the addition of aqueous ammonia solution (see table below). The mixture was cooled to 30° C., filtered and the filter-cake washed once by resuspension for 15 minutes in distilled water. The final filter-cake was dried 120° C. broken down to pass 18 mesh (B.S.S.) and heat-treated at 380° C. for 3 hours in an atmosphere of nitrogen. The dry product was mixed with graphite (1% by weight), pelleted and the pellets heated to 850° C. in a stream of air, the temperature being raised from 200° C. at the rate of 20° C. per hour, then maintained at 850° C. for 16 hours.

The catalysts were tested by passing a gaseous mixture of by volume 7% propylene, 63% air and 30% steam over the catalyst in a reactor at ca. 340–370° C. and 3 seconds contact time (calculated N.T.P.). The reactor inlet pressure was 40 p.s.i.g. The results obtained are given in the following table:

| pH of suspension | Combined yield of acrolein/acrylic acid based on propylene fed | Yield of acrolein based on propylene fed | Yield of acrylic acid based on propylene fed |
|---|---|---|---|
| 6.8 | 57 | 38 | 19 |
| 7.0 | 64 | 41 | 23 |
| 7.2 | 69 | 41 | 28 |
| 7.4 | 72 | 47 | 25 |
| 7.7 | 78 | 45 | 33 |

The above data clearly demonstrates the improved combined yield of acrolein/acrylic acid obtainable by use of the catalyst of the present invention.

I claim:
1. A catalyst, suitable for catalysing the vapor phase oxidation of propylene with molecular oxygen to produce acrolein together with acrylic acid, which comprises an oxide composition containing antimony, vanadium and tin prepared by adding ammonium vanadate to a suspension of antimony trioxide in nitric acid, adding powdered tin to the resultant suspension, adjusting the pH of the suspension to 7 or above, recovering suspended solid, and finally heating the recovered solid in a molecular oxygen containing gas at a temperature in the range 550 to 1,000° C.

2. A catalyst as claimed in Claim 1 wherein the oxide composition contains an excess of antimony over any other single component.

3. A catalyst as claimed in Claim 1 wherein the oxide composition contains antimony and vanadium in atomic ratio within the range of 1.5:1 to 4:1.

4. A catalyst as claimed in Claim 1 containing vanadium and tin in atomic ratio 1:0.25 to 1:2.

5. A catalyst as claimed in Claim 1 wherein the pH of the suspension is adjusted to between 7 and 9.

6. A catalyst as claimed in Claim 1 wherein the recovered solid is heated in an inert atmosphere to a temperature in the range 200 to 500° C., the heated solid thereafter is pelleted and the pellets subjected to a further heating at a temperature within the range 550° to 1,000° C., in a molecular oxygen container gas.

7. A catalyst as claimed in Claim 1 deposited upon a support material.

8. A catalyst as claimed in Claim 7 wherein the support material is selected from alumina, pumice, silica and titania.

9. A catalyst as defined in claim 1 wherein, prior to adjustment of the pH of the suspension, solids are recovered from the suspension and resuspended in water.

References Cited

UNITED STATES PATENTS

| 3,554,931 | 1/1971 | Brown | 252—461 X |
| 3,269,957 | 8/1966 | Bethell | 252—461 X |
| 3,579,574 | 5/1971 | Van der Meer | 260—530 |

CARL F. DEES, Primary Examiner

U.S. Cl. X.R.

252—461, 464

UNITED STATES PATENT OFFICE
CERTIFICATE OF CORRECTION

Patent No. 3,830,754      Dated August 20, 1974

Inventor(s) WILLIAM JOHN BALL

It is certified that error appears in the above-identified patent and that said Letters Patent are hereby corrected as shown below:

Col. 1, line 31, correct the spelling of "range"
    Col. 2, line 8, "most" should read "moist"
    Col. 2, line 32, "an" should read "in"
    Col. 4, line 13, claim 1, correct the spelling of
                   "catalyst".

Signed and sealed this 12th day of November 1974.

(SEAL)
Attest:

McCOY M. GIBSON JR.          C. MARSHALL DANN
Attesting Officer             Commissioner of Patents